United States Patent
Boul et al.

(10) Patent No.: US 11,084,967 B2
(45) Date of Patent: Aug. 10, 2021

(54) FUNCTIONALIZED NANOSILICA AS SHALE INHIBITOR IN WATER-BASED FLUIDS

(71) Applicant: Saudi Arabian Oil Company, Dhahran (SA)

(72) Inventors: Peter J. Boul, Houston, TX (US); B. Raghava Reddy, Pearland, TX (US); Carl Thaemlitz, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/791,647

(22) Filed: Feb. 14, 2020

(65) Prior Publication Data

US 2020/0181472 A1    Jun. 11, 2020

Related U.S. Application Data

(62) Division of application No. 15/422,061, filed on Feb. 1, 2017, now Pat. No. 10,611,942.

(Continued)

(51) Int. Cl.
*C09K 8/10* (2006.01)
*C09K 8/14* (2006.01)
(Continued)

(52) U.S. Cl.
CPC ............... *C09K 8/10* (2013.01); *C09K 8/06* (2013.01); *C09K 8/14* (2013.01); *C09K 8/40* (2013.01);
(Continued)

(58) Field of Classification Search
CPC .......... C09K 8/10; C09K 8/14; C09K 8/5045; C09K 8/514; C09K 2208/10; C09K 2208/12; Y10S 507/901
See application file for complete search history.

(56) References Cited

U.S. PATENT DOCUMENTS

| | | |
|---|---|---|
| 7,033,975 B2 | 4/2006 | Baran et al. |
| 7,721,803 B2 | 5/2010 | Huang et al. |

(Continued)

FOREIGN PATENT DOCUMENTS

| | | |
|---|---|---|
| CN | 101818050 A | 9/2010 |
| WO | WO2016070044 A1 | 5/2016 |

OTHER PUBLICATIONS

Boul, et al., Functionalized Nanosilicas as Shale Inhibitors in Water-Based Drilling Fluids, Offshore Technology Technology Conference, May 2, 2016-May 5, 2016, XP055371921.

(Continued)

*Primary Examiner* — Aiqun Li
(74) *Attorney, Agent, or Firm* — Bracewell LLP; Contance Gall Rhebergen

(57) ABSTRACT

A nanosilica containing fluid system for shale stabilization in a shale formation. The nanosilica containing fluid system comprising a functionalized nanosilica composition operable to react with shale at the surface of the shale formation to form a barrier on the shale formation. The functionalized nanosilica composition comprising a nanosilica particle, the nanosilica particle having a mean diameter, and a functionalization compound, the functionalization compound appended to the surface of the nanosilica particle. And an aqueous-based fluid, the aqueous-based fluid operable to carry the functionalized nanosilica composition into the shale formation. The functionalization compound is an amino silane. The aqueous-based fluid is selected from the group consisting of water, deionized water, sea water, brine, and combinations thereof.

11 Claims, 13 Drawing Sheets

Related U.S. Application Data

(60) Provisional application No. 62/290,001, filed on Feb. 2, 2016.

(51) Int. Cl.
*C09K 8/504* (2006.01)
*C09K 8/506* (2006.01)
*C09K 8/06* (2006.01)
*C09K 8/40* (2006.01)

(52) U.S. Cl.
CPC .......... *C09K 8/506* (2013.01); *C09K 8/5045* (2013.01); *C09K 2208/10* (2013.01); *C09K 2208/12* (2013.01)

(56) References Cited

U.S. PATENT DOCUMENTS

| | | |
|---|---|---|
| 7,829,506 B1 | 11/2010 | Tehranchi |
| 8,307,897 B2 | 11/2012 | Reyes et al. |
| 8,822,386 B2 | 9/2014 | Quintero et al. |
| 9,006,151 B2 | 4/2015 | Amanullah et al. |
| 2003/0220204 A1 | 11/2003 | Baran |
| 2004/0231844 A1 | 11/2004 | Nguyen et al. |
| 2005/0173117 A1 | 8/2005 | Roddy |
| 2007/0036977 A1 | 2/2007 | Sinclair et al. |
| 2008/0300153 A1 | 12/2008 | Crews et al. |
| 2009/0099282 A1 | 4/2009 | Mueller et al. |
| 2009/0314549 A1 | 12/2009 | Chenevert et al. |
| 2010/0018709 A1 | 1/2010 | Parlar et al. |
| 2010/0089578 A1 | 4/2010 | Nguyen et al. |
| 2012/0285689 A1 | 11/2012 | Weaver et al. |
| 2014/0096964 A1 | 4/2014 | Chakraborty et al. |
| 2014/0262296 A1 | 9/2014 | Dobson, Jr. et al. |
| 2015/0119301 A1 | 4/2015 | McDaniel et al. |
| 2016/0168449 A1 | 6/2016 | Al-Muntasheri |

OTHER PUBLICATIONS

Dai, Caili, et al. "The first study of surface modified silica nanoparticles in pressure-decreasing application." RSC Advances 5.76 (2015): 61838-61845.
Hoelscher, et al., SPE157031 Application of Nanotechnology in Drilling Fluids, SPE International OilField Nanotechnology Conference, Jun. 14, 2012, XP055373511.
Moslemizadeh, et al., Minimizing Water Invasion into Kazhdumi Shale Using Nanoparticles, Iranian Journal of Oil & Gas Science and Technology, Apr. 29, 2015, pp. 15-32, XP055373503.
PCT/US2017/016128 International Search Report and Written Opinion dated Jun. 2, 2017; 14 pgs.
Riley, Meghan, et al. "Wellbore Stability in Unconventional Shales— The Design of a Nano-Particle Fluid." SPE Oil and Gas India Conference and Exhibition. Society of Petroleum Engineers, SPE 153729 2012. (pp. 1-8).
Sensoy, Taner, et al. "Minimizing water invasion in shales using nanoparticles." SPE Annual Technical Conference and Exhibition. Society of Petroleum Engineers, SPE 124429 2009. (pp. 1-16).
Thomson Scientific, WPI/ 2017 Clarivate Analytics, XP-002770237, Univ Southwest Petroleum dated Sep. 1, 2010, 4 pgs.
Ying-Mei, Xu et al., "Preparation of amorphous silica from oil shale residue and surface modification by silane coupling agent." Oil Shale 27.1 (2010): 37-46.
Young, et al., Environmentally Friendly Drilling Fluids for Unconventional Shale—Google Search, Offshore Mediterranean Conference, Mar. 20, 2013, XP055373507, ISBN: 978-88-94043-61-7.

FUNCTIONALIZED NANOSILICA AS SHALE INHIBITOR IN WATER-BASED FLUIDS

CROSS REFERENCE TO RELATED APPLICATIONS

This application is a divisional application of U.S. Non-Provisional application Ser. No. 15/422,061 filed on Feb. 1, 2017, which claims priority from U.S. Provisional Application No. 62/290,001 filed on Feb. 2, 2016. For purposes of United States patent practice, this application incorporates the contents of both the Provisional Application and Non-Provisional Application by reference in their entirety.

TECHNICAL FIELD

Disclosed are compositions for shale inhibition. More specifically, embodiments related to compositions for shale inhibition in water-based fluids are disclosed.

BACKGROUND

Water-based muds (WBMs) are attractive alternatives to oil and synthetic muds for drilling in environmentally sensitive areas where oil-based muds are undesired. WBMs do, however, display adverse reactions when drilling through shales. Water invasion in shale formations weakens the wellbore and leads to difficulties in drilling such as stuck pipe and hole collapse. When in contact with water, shales are widely known to undergo physical and chemical changes due to ion exchange, changes in shale water content, and changes in swelling pressure within the shales. These changes have a direct effect on the chemical and physical stability of the shales. The low (nanodarcy) permeabilities of shales prevents normal filtration additives in WBMs from building the necessary filter cake structures against the wellbore rock formation. Fluid invasion into or exposure to the surrounding formation can therefore not be prevented with fluid loss control additives and a different class of additives is required for preventing shales from reacting with water in WBMs. In these cases, WBMs with specialized shale inhibiting additives are often required.

Different shale inhibiting additives have been developed with the goal of decreasing ion exchange, changes in water content of shales, and changes in swelling pressures in shales. Additives which have been investigated and deployed for use as shale stabilizers are potassium chloride (KCl), organic polymers, polyglycols, polygylcerols, and silicates. Shale-stabilizing muds formulated with the shale inhibiting additives are designed to prevent shale hydration by viscosifying the water in drilling fluids, plugging pores in shales, and osmotically dehydrating shales.

The use of KCl as a clay stabilizer can increase dispersion in some shales. Shales which are rich in kaolinite can lose strength when exposed to KCl due to cation exchange with potassium. Silicate muds are known to be effective in inhibiting swelling and dispersion of shale and chalk. Potassium and sodium chloride salts are known to have certain synergies with silicates. Potassium ions ($K^+$) and sodium ions ($Na^+$) can exchange with calcium ions ($Ca^{2+}$) on shale surfaces to render more $Ca^{2+}$ in the drilling fluid. The $Ca^{2+}$ then precipitates as calcium silicate which may adhere to the shale surface. Monovalent salts also are known to reduce the gel time for the silicates leading to the deposition of polymerized silicate gel onto the shales. However, salts in large quantities adversely affect the environment by altering water and soil quality. In the United States, government regulations prohibit the disposal of greater than 3,000 parts-per-million (ppm) chloride on lease or 1,000 ppm chloride off lease. For this reason, salt water brines have to be hauled away from the drillsite for disposal. Additionally, silicate muds are highly caustic (pH=11-12.5) which poses a risk in the field. Moreover, there are concerns about silicate mud fluid properties, long term wellbore stabilization and formation damage potential.

SUMMARY

Disclosed are compositions for shale inhibition. More specifically, embodiments relate to compositions for shale inhibition in water-based fluids.

In a first aspect, a nanosilica containing fluid system for shale stabilization in a shale formation is provided. The nanosilica containing fluid system includes a functionalized nanosilica composition operable to inhibit the erosion of shale. The functionalized nanosilica composition includes a nanosilica particle, the nanosilica particle having a mean diameter and a functionalization compound, the functionalization compound appended to the surface of the nanosilica particle. The nanosilica containing fluid system further includes an aqueous-based fluid, the aqueous-based fluid operable to carry the functionalized nanosilica composition into the shale formation. The nanosilica containing fluid system further includes a synergistic polymer additive operable to interact synergistically with the functionalized nanosilica composition.

In certain aspects, the functionalization compound is an amino silane. In certain aspects, the amino silane is selected from the group consisting of methoxysilanes, ethoxysilanes, and chlorosilanes. In certain aspects, the functionalization compound is an amino(alkyl)$_n$-amino(alkyl)$_m$ silane, where the alkyl groups are composed of 1 to 18 carbon atoms per molecule, and where n is a number between 1 and 18 and m is a number between 1 and 18. In certain aspects, the functionalization compound is an amino(alkyl)$_x$ silane, where the alkyl group is composed of 1 to 18 carbon atoms per molecule and where n is a number between 1 and 18. In certain aspects, the functionalization compound is 2-aminoethyl-3-aminopropyl trimethoxysilane. In certain aspects, the mean diameter of the nanosilica particle is between 1 nanometer (nm) and 1000 nm. In certain aspects, the mean diameter of the nanosilica particle is less than 20 nm. In certain aspects, the aqueous-based fluid is selected from the group consisting of water, deionized water, sea water, brine and combinations thereof. In certain aspects, the synergistic polymer additive is polyanionic cellulose. In certain aspects, the nanosilica containing fluid system further includes added salt.

In a second aspect, a composition for shale stabilization is provided. The composition includes a nanosilica particle, the nanosilica particle having a mean diameter, a functionalization compound, the functionalization compound appended to the surface of the nanosilica particle, and a synergistic polymer additive. The functionalized nanosilica composition and the synergistic polymer additive are operable to interact synergistically such that the synergy between the functionalized nanosilica composition and the synergistic polymer additive is operable to provide shale inhibition.

In a third aspect, a method for shale stabilization in a shale formation is provided. The method including the steps of introducing a nanosilica containing fluid into the shale formation. The nanosilica containing fluid includes a functionalized nanosilica composition operable to inhibit shale erosion of the shale formation, an aqueous-based fluid, the aqueous-based fluid operable to carry the functionalized nanosilica composition into the shale formation, and a synergistic polymer additive. The method further includes the step of allowing the functionalized nanosilica composition to inhibit shale erosion of the shale formation. The functionalized nanosilica composition and the synergistic polymer additive are operable to interact synergistically such that the synergy between the functionalized nanosilica composition and the synergistic polymer additive is operable to provide shale inhibition.

BRIEF DESCRIPTION OF THE DRAWINGS

These and other features, aspects, and advantages will become better understood with regard to the following descriptions, claims, and accompanying drawings. It is to be noted, however, that the drawings illustrate only several embodiments and are therefore not to be considered limiting of the inventive scope as it can admit to other equally effective embodiments.

DETAILED DESCRIPTION

Figure 1:
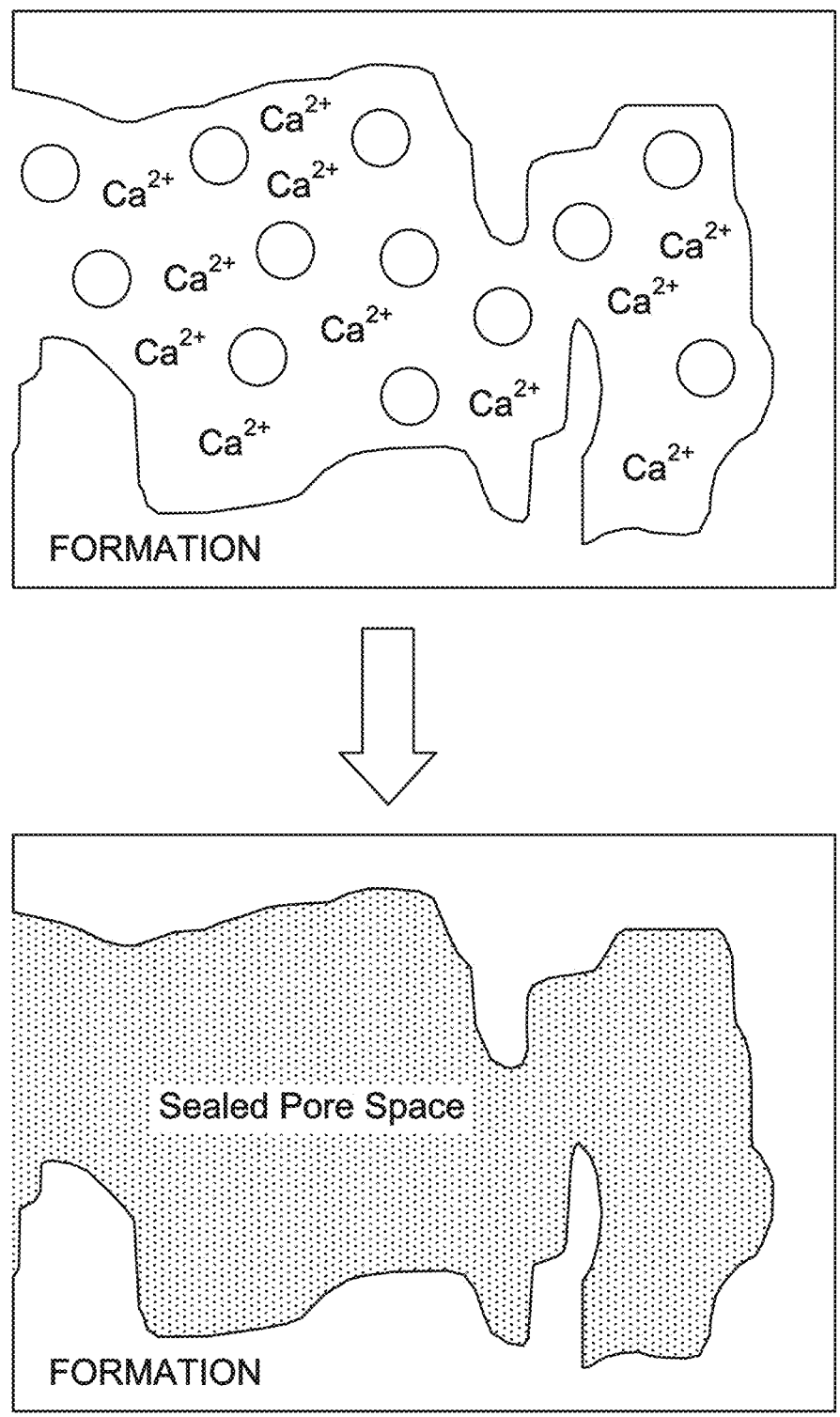
FIG. 1 is a pictorial representation of the interaction between silicates and shale.

While the scope will be described with several embodiments, it is understood that one of ordinary skill in the relevant art will appreciate that many examples, variations and alterations to the apparatus and methods described are within the scope and spirit of the embodiments. Accordingly, the embodiments described here are set forth without any loss of generality, and without imposing limitations. Those of skill in the art understand that the inventive scope includes all possible combinations and uses of particular features described in the specification. In both the drawings and the detailed description, like numbers refer to like elements throughout.

The functionalized nanosilica compositions described here are fluid systems that can be used as shale inhibiting additives in water-based fluids for in shale formations. The functionalized nanosilica compositions described here advantageously improve shale inhibition with reduced environmental impact over conventional shale inhibitors. The functionalized nanosilica compositions can be effective in maintaining well stability and in preventing equipment problems, such as bit balling or sloughing. The functionalized nanosilica compositions described here that are included in an aqueous-based fluid reduce shale erosion as compared to conventional shale inhibition muds, such as silicate muds and potassium chloride muds. The functionalized nanosilica compositions described here advantageously reduce shale erosion by at least between 14 percent (%) and 19 percent (%) and can be useful as shale inhibiting additives. The functionalized nanosilica compositions can invade pore spaces near the wellbore in the shale surface of the shale formation and react with the shale to form a barrier or coating on the shale surface and sealing the pore space. Additionally, the functionalized nanosilica compositions can interact with the shale surface by forming a barrier membrane to water penetration, thereby preventing swelling of the shale grains.

As used here, "aqueous-based fluid" refers to a water-based fluid that is used to drill a wellbore or for other wellbore activities. Aqueous-based fluids are also known as muds. Aqueous-based fluids suitable for use in the embodiments can have a salt concentration due to the presence of salt in the water-based fluid. The salt concentration can be in the range from between less than 1 pound per barrel to 30 pounds per barrel. Examples of aqueous-based fluids include fresh water, deionized water, sea water, brine, and combinations of the same.

As used throughout, the term "nanosilica" refers to a colloidal silica particle with a diameter in the range between 1 nm to 1000 nm. Particles can include spherical shaped particles and oblong or cigar shaped particles. Cigar shaped nanosilica particles have dimensions in the range of 9 nm to 15 nm in diameter and 40 nm to 100 nm in length. References to "nanosilica particle" include the plural, such that nanosilica particle means nanosilica particles as appropriate within the description.

As used throughout, the term "shale" refers to a sedimentary rock comprised of quartz, silicates, carbonates, and clays. The clay content in shales can make them reactive to water-based fluids. Different kinds of clays can have different reactivities with water and as a result different shales can exhibit different reactivities. For instance, a shale with a high smectite content can have a higher reactivity to water than a shale with a higher illite content.

As used throughout, the term "shale inhibition" and "shale stabilization" refer to the ability to prevent or inhibit shale dispersion, shale swelling, shale erosion, and other interactions between shale with water and the clays within the shale with water. Shale inhibition is a form of erosion control. Shale inhibition includes both chemical inhibition and physical inhibition. Examples of chemical inhibition include reaction between $Ca^{2+}$ ions from the shale or clay and the functionalization compound of the functionalized nanosilica composition. An example of physical inhibition includes sealing the surface of the shale. Without being bound to a particular theory, it is believed that physical inhibition occurs when the nanosilica particles condense and coat the shale surface thus forming an osmotic membrane on the shale, as illustrated in FIG. 1. The osmotic membrane forms a barrier on the shale blocking water from reaching the shale. Due to the size of the nanosilica particles, the functionalized nanosilica composition can enter the pores of the shale and react with the shale to form a barrier-to-water more fully than conventional silicate based shale inhibiting additives.

As used here, "erosion" refers to shale reactivity with a drilling fluid that causes a change in rheology of the drilling fluid. Erosion can be due to water intruding between the layers of the shale, without moving into the shale itself.

Shale inhibition differs from pore plugging. As used here, "pore plugging" refers to processes or methods to reduce the permeability of shale.

In at least one embodiment, the functionalized nanosilica composition includes a nanosilica particle that has been surface functionalized by a functionalization compound. The functionalized nanosilica composition is then mixed with the aqueous-based fluid and a synergistic polymer additive to produce a nanosilica containing fluid.

The nanosilica particle can have a mean diameter in the range between 1 nm and 1000 nm, alternately between 1 nm and 500 nm, alternately less than 250 nm, alternately less than 100 nm, alternately less than 50 nm, alternately less than 25 nm, and alternately less than 20 nm.

The functionalization compound can be any compound that contains a reactive group or ligand capable of or operable to inhibit shales. Examples of functionalization compounds include amino silanes. As used throughout, "amino silanes" refers to functional groups where the silicon atom of the silane group (—Si—) is separated from the amino group by between 1 and 18 methylene groups. One of skill in the art will understand that as used here, "amino" refers to amines that when dissolved in water below pH 10.5 are present in a protonated form, meaning an ammonium form, at a concentration that can be greater than 50%. The amino group can be primary, secondary, tertiary, quaternary, and combinations of the same. One of skill in the art will understand that as used here "quaternary" refers to a quaternary ammonium cation. Amino silanes as used here can include between 1 and 5 amino groups. In at least one embodiment, the functionalization compound can be an amino(alkyl)$_n$-amino(alkyl)$_m$, silane, where the alkyl group are composed of 1 to 18 carbon atoms per molecule, n is a number between 1 and 18 and m is a number between 1 and 18. In at least one embodiment, the functionalization compound can be an amino(alkyl)$_x$ silane, wherein the alkyl group is composed of 1 to 18 carbon atoms per molecule, wherein n is a number between 1 and 18. Examples of amino silanes include methoxysilanes, ethoxysilanes, and chlorosilanes. Examples of methoxysilanes include 2-aminoethyl-3-aminopropyl trimethoxysilane (AEAPTS), aminopropyltrimethoxysilane and aminophenyltrimethoxysilane. Examples of ethoxysilanes include aminoundecyltriethoxysilane, aminopropylmethyldiethoxysilane, and aminobutyltriethoxysilane. In at least one embodiment, the amino silane is AEAPTS.

Figure 2:
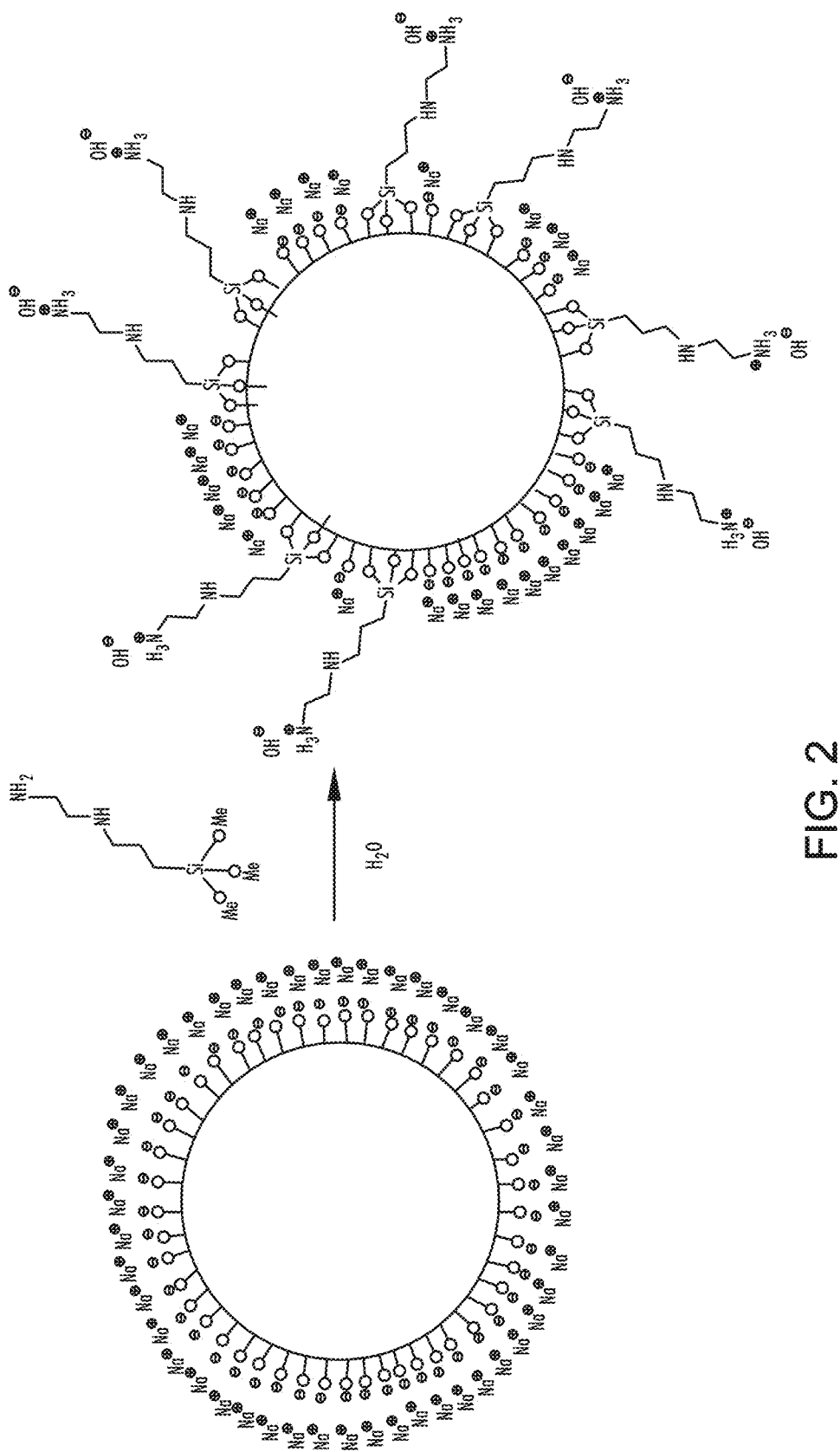
FIG. 2 is a pictorial representation of the functionalization of a nanosilica particle with an aminoalkylmethoxysilane compound.

Any method known to be capable of functionalizing a particle can be used. In at least one embodiment, the functionalization compound and the nanosilica particle can be mixed together in the presence of water and stirred for a period of time to carry out the reaction between the functionalization compound and the nanosilica particle. In at least one embodiment, the functionalization compound and the nanosilica particle can be mixed together in the presence of a polar solvent and water and stirred for a period of time to carry out the reaction between the functionalization compound and the nanosilica particle. The polar solvent can be any polar solvent that is partially or fully miscible with water. Example of a polar solvent can include methanol. In at least one embodiment, the functionalization compound and the nanosilica particle are mixed at a ratio of the functionalization compound to nanosilica of 1:20. FIG. 2 is a representation of the reaction between a nanosilica particle and AEAPTS as the functionalization compound in the presence of water. In at least one embodiment, the functionalization compound is appended to the surface of the nanosilica particle. As used here, the term "append" refers to covalent or ionic bonding and physical or chemical adsorption as means of attaching a functionalization compound to a nanosilica particle surface.

The aqueous-based fluid is operable to carry the functionalized nanosilica composition into a shale formation.

The functionalized nanosilica composition can be added to the aqueous-based fluid at a concentration of between greater than 0.01 percent by weight (wt %) and 10 wt %, alternately between greater than 0.01 wt % and 5 wt %, alternately between 1 wt % and 5 wt %, and alternately less than 5 wt %.

The synergistic polymer additives can be present in an amount between 0.1 pounds per barrel (lbm/bbl) and 15 lbm/bbl and alternately between 0.5 lbm/bbl and 10 lbm/bbl. As used throughout, "synergy", "synergistic", or "synergistically" refers to an interplay between components in a mixture that when combined can produce an overall result that is greater than the sum of the individual components. Synergistic polymer additives can include anionic polymers, water soluble polymers, polymers with low cationic charge, polyglycolic acid, polyvinyl sulfonate, polyvinyl amide, polyacrylamide polymer, polyanionic cellulose polymers, polydiallyldimethylammonium chloride (polyDADMAC), partially hydrolyzed polyacrylamide (PHPA), acrylamide butylsulfonic acid (ATBS) monomer, and combinations thereof. In at least one embodiment, the synergistic polymer additive is a polyacrylamide polymer and the functionalized nanosilica composition functions synergistically with the polyacrylamide polymer to inhibit shales. In at least one embodiment, the synergistic polymer additive is a polyanionic cellulose polymer and the functionalized nanosilica composition functions synergistically with the polyanionic cellulose polymer to provide shale inhibition. In at least one embodiment, the absence of a synergistic polymer additive results in greater shale erosion.

The nanosilica containing fluid can be used in any well drilling and well completion phase process. In at least one embodiment, the nanosilica containing fluid is used as a spacer fluid. In at least one embodiment, the nanosilica containing fluid is used as a flush fluid. In at least one embodiment, the nanosilica containing fluid is used as a drilling fluid. In at least one embodiment, the nanosilica containing fluid is not used during a production phase process.

In at least one embodiment, the nanosilica containing fluid can include an added salt. Salts suitable for use as the added salt in the nanosilica containing fluid include KCl and sodium chloride (NaCl). In at least one embodiment, salt is added to the nanosilica containing fluid when the aqueous-based fluid is fresh water. In at least one embodiment, salt is added to the nanosilica containing fluid when the aqueous-based fluid is sea water.

In at least one embodiment, the nanosilica containing fluid is contains salt quantities less than 10 pounds per barrel, including added salt.

In at least one embodiment, the functionalized nanosilica compositions seal the surfaces of the shales due to the small size of the silica particles, because they can penetrate into small pores and microfissures or cracks in the shale. Once localized on the surface of the shale or within the pore space, the functionalized nanosilica compositions can gel and seal the volume preventing shale erosion and hydration.

Examples

Shale Inhibiting Additives

All of the nanosilica particle suspensions were provided by Nissan Chemical USA, Ltd. (Houston, Tex.). AEAPTS was obtained from Momentive Performance Materials Inc. (Waterford, N.Y.).

Nanosilica A as a Comparative Shale Inhibiting Additive.

Nanosilica A contained 30% solids and was used without any functionalization compound being appended to the surface. The surface of Nanosilica A included silicon oxide.

Nanosilica B as a Comparative Shale Inhibiting Additive.

Nanosilica B contained 30% solids and was a functionalized nanosilica particle with a 12 nm particle diameter. Nanosilica B is functionalized through a proprietary process of Nissan Chemical.

Nanosilica C as a Functionalized Nanosilica Composition.

Nanosilica C was the same as nanosilica A with a 10 nm to 20 nm particle diameter and functionalized with AEAPTS. One gram of AEAPTS was added to 20.0 grams of Nanosilica A and stirred for one hour prior to placement in the aqueous-based fluid.

Nanosilica D as a Functionalized Nanosilica Composition.

Nanosilica D contained 5% solids and was a functionalized nanosilica particle with a particle size between 1-5 nm and was functionalized with AEAPTS.

Control Composition as a Comparative Shale Inhibiting Additive.

One gram of AEAPTS was added to 20.0 grams of DI water and stirred for one hour prior to placement in the aqueous-based fluid.

Pierre II and Mancos Shale Mineralogical Analysis

Mancos shale was purchased from Kocurek Industries, Caldwell, Tex. The Mancos shale was quarried out of Salt Lake City, Utah. Pierre II shale was purchased from TerraTek, Salt Lake City, Utah, a Schlumberger Company. The Pierre II shale comes from central South Dakota.

The Mancos shale and Pierre II shales were pulverized with an Angstrom Model TE250 Ring Puverizer ball mill and analyzed with X-ray diffraction (XRD) for minerology. The diffractometer used was a Bruker D8 advance eco diffractometer system. Clay types in the shale samples were identified through separation of clays. In this test, a spatula of pulverized shale was added to a test tube along with 2-3 drops of an aqueous sodium hexametaphosphate solution. The sample was then sonicated to disperse the particles. The test tube was then centrifuged and the top layer of the suspension was removed with a pipette and the bottom layer was passed through a filter paper. The filter cake formed on the filter paper was smeared onto a microscope slide and the sample was scanned with XRD. The glass slide was then placed into an ethylene glycol mist chamber overnight and afterwards heated to 550° C. for four hours then re-scanned with XRD.

Results

Figure 3:
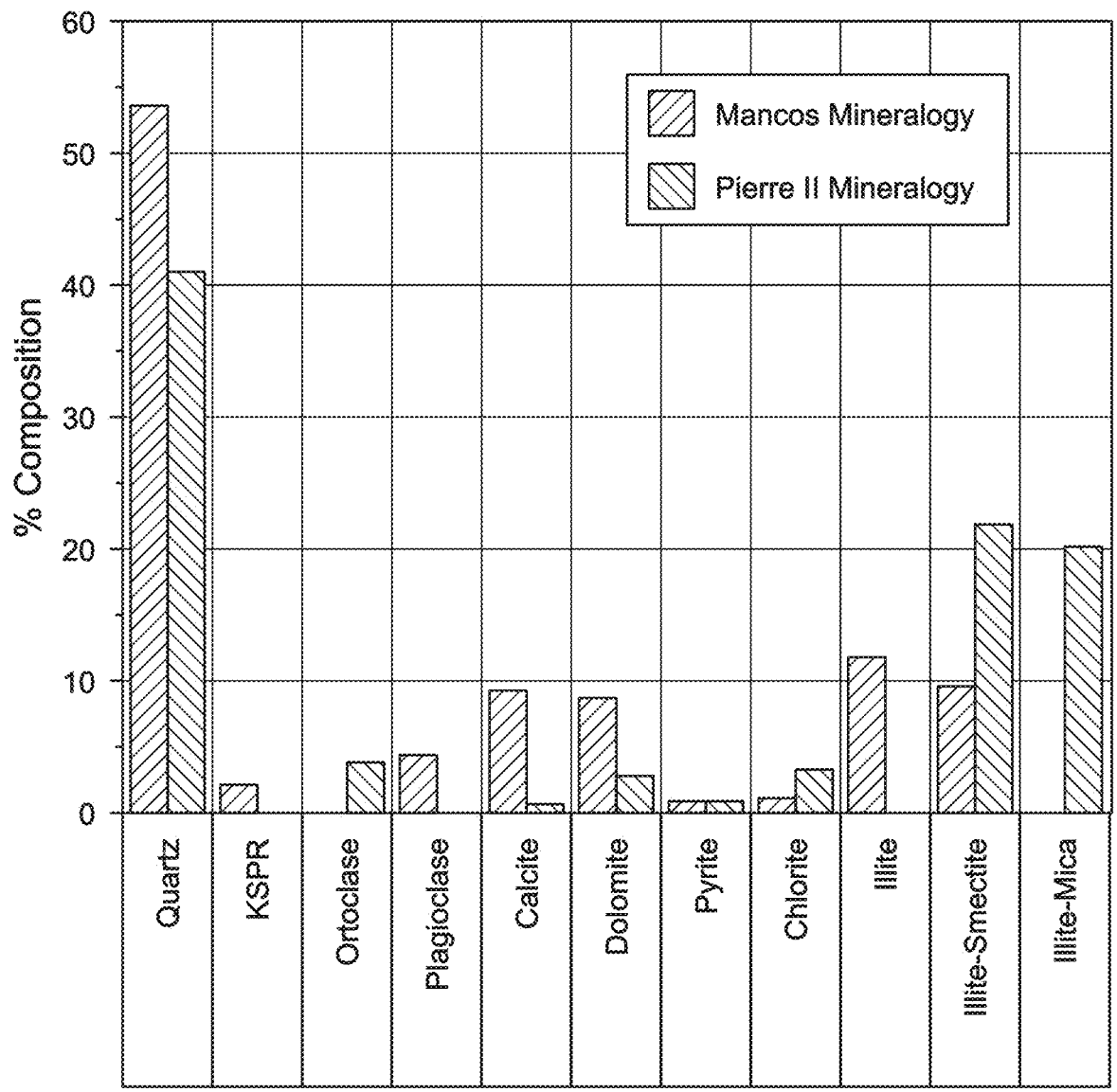
FIG. 3 is a graphical representation of a Rietveld analysis of the Mancos shale and the Pierre II shale used in the Examples.

FIG. 3 is a graph showing the Rietveld analysis of the components of the Mancos shale and the Pierre II shale. The Mancos shale tested contains about 9.5% of an illite/smectite mixed layer with a ratio of smectite:illite of 1:1. Pierre II shale, on the other hand, contains 21.7% of an illite/smectite mixed layer with approximately 70% smectite and 30% illite. Pierre II shale also contains 20.0% of an illite/mica mixed layer. Smectite is the component of the shale that is the most reactive to water. Because Pierre II shale has a greater amount of smectite this type of shale shows itself to be more reactive to water than Mancos shale. Pierre II shale is more demanding regarding the requirement for inhibition.

Preparation of Shale Samples for Hot Roll Studies

For shale erosion studies, shale cuttings were broken into small pieces with a Retsch BB50 equipment or manually with a hammer, and passed through a number (#) 4 size mesh screen. The shale material that passed through the #4 mesh screen was then passed over a #8 mesh screen. The material that passed through the #8 mesh screen was disposed of, while the material that was held up by the screen was saved for shale erosion studies. The material held up by the #8 mesh screen provides that the shales used in the hot roll procedure will have a standardized volume to surface area ratio, which means that from experiment to experiment roughly the same volume to surface ratio was exposed to the aqueous-based fluid.

Hot Roll Procedure

The shale sample was placed in 350 milliliters (mL) of the water-based fluids according to the Experiments as described. In Experiments A-E, the aqueous-based fluid was deionized water. Potassium hydroxide (KOH) was used to adjust the pH of the deionized water to make it slightly alkaline. Specifically, enough KOH was added to three (3) liters (L) of deionized water to make the aqueous-based fluid have a pH of between 8.5 and 10. The shale inhibiting additives were added to the aqueous-based fluid and then 30 grams (g) of shale was added to the aqueous-based fluid. The aqueous-based fluid containing the shale was then placed in a roller oven at 150° F. for 16 hours. After the hot rolling procedure, the shale was removed from the aqueous-based fluid and dried in the oven. The shale was then sieved between a #4 mesh screen and a #8 mesh screen. The shale remaining on the #8 mesh screen was then weighed and compared with the weight before the hot rolling procedure. The percent of shale erosion was calculated as:

[1−(weight retained/weight of the original shale)] *100     Equation 1

Experiment A

Experiment A was a comparison study that tested the effect of the shale inhibiting additives, including the functionalized nanosilica compositions, on the rate of shale erosion. The composition for each test performed with Mancos shale is in Table 1 and the composition for each test performed with Pierre II shale is in Table 2.

TABLE 1

Shale Inhibiting Additives tested on Mancos shale.

| Sample | Shale Inhibiting Additive (wt %) | Water (mL) | Additive (g) | pH |
|---|---|---|---|---|
| 1 | Control Composition | 350 | 0 | 10 |
| 2 | 0.7% Nanosilica A | 350 | 2.5 | 9.65 |
| 3 | 1.4% Nanosilica A | 350 | 5.0 | 9.65 |
| 4 | 2.8% Nanosilica A | 350 | 10.0 | 9.65 |
| 5 | 0.7% Nanosilica B | 350 | 2.5 | 9.65 |
| 6 | 1.4% Nanosilica B | 350 | 5.0 | 9.65 |
| 7 | 2.8% Nanosilica B | 350 | 10.0 | 9.65 |

TABLE 2

Shale inhibiting additives tested on Pierre II shale.

| Sample # | Shale Inhibiting Additive (wt %) | Water (mL) | Additive (g) |
|---|---|---|---|
| 1 | Control Composition | 350 | 0 |
| 2 | 0.7% Nanosilica A | 350 | 2.5 |
| 3 | 1.4% Nanosilica A | 350 | 5 |
| 4 | 2.8% Nanosilica A | 350 | 10 |
| 5 | 0.7% Nanosilica B | 350 | 2.5 |
| 6 | 1.4% Nanosilica B | 350 | 5.0 |
| 7 | 2.8% Nanosilica B | 350 | 10.0 |

Results

Experiment A with the nanosilica containing fluid samples with the Pierre II shale (Table 2) revealed that no shale remained that could be caught in the #8 screen for any of the shale inhibiting additives tested. All of the solid that was present was present as a sludge, indicating that the functionalized nanosilica compositions alone are ineffective in shale inhibition of Pierre II shale.

Figure 4:
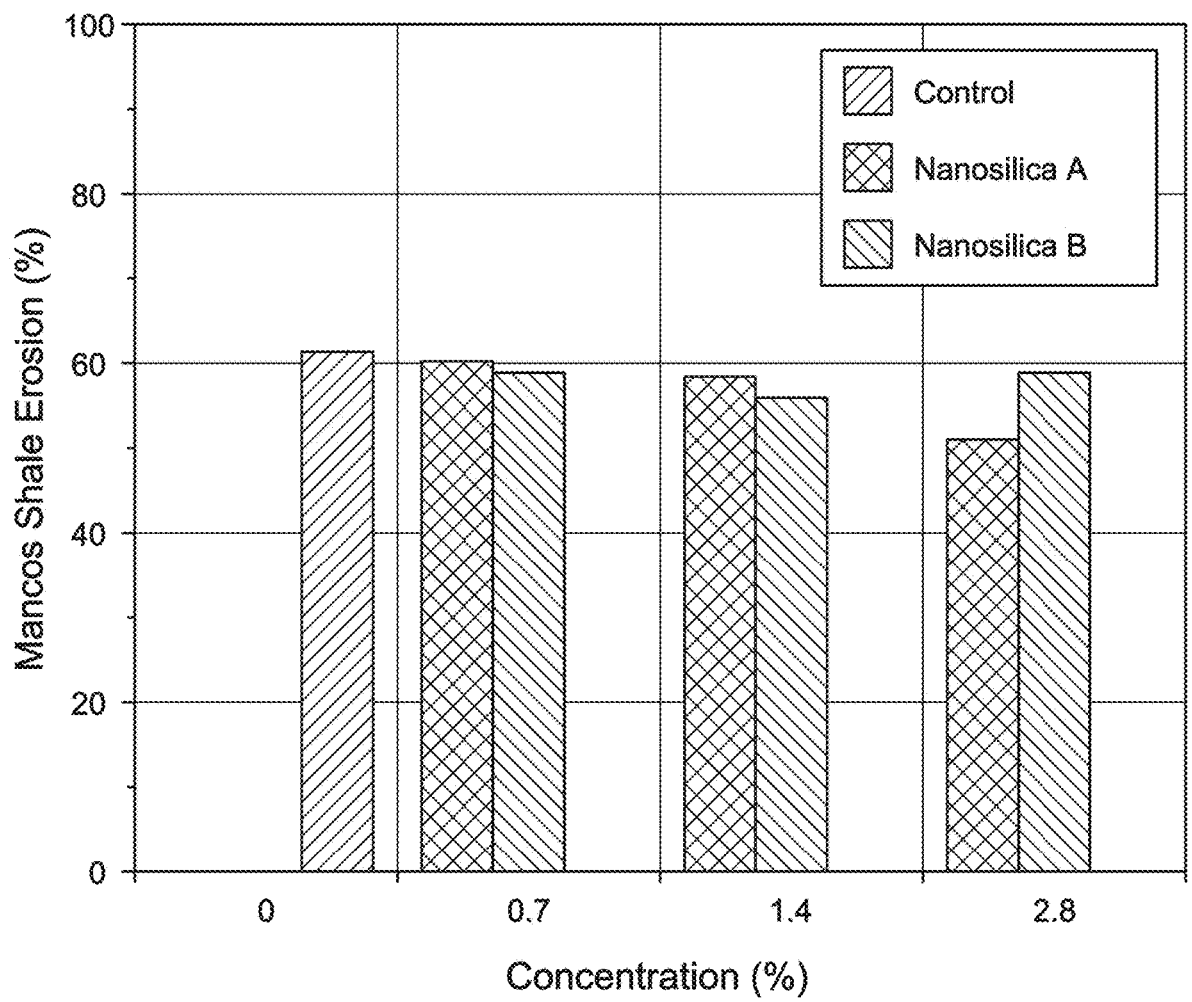
FIG. 4 is a graphical representation of shale erosion data for Mancos shale where the samples were hot rolled in water with a shale inhibiting additive according to Experiment A.

Mancos shale, however, was recoverable after the hot rolling procedure. FIG. 4 is a graph of the shale erosion data for Mancos shale where the samples were subjected to the Hot Roll Procedure in water with a shale inhibiting additive. As shown in FIG. 4, 60.9% shale erosion was found for Mancos shale hot rolled in the absence of a shale inhibitor additive, just in pH 10 water. The best results were observed from 2.8% Nanosilica A and 1.4% Nanosilica B where 50.4% and 55.6% shale erosion were determined after the hot roll. These three values may be within experimental error of one another.

Experiment B

Figure 5A:
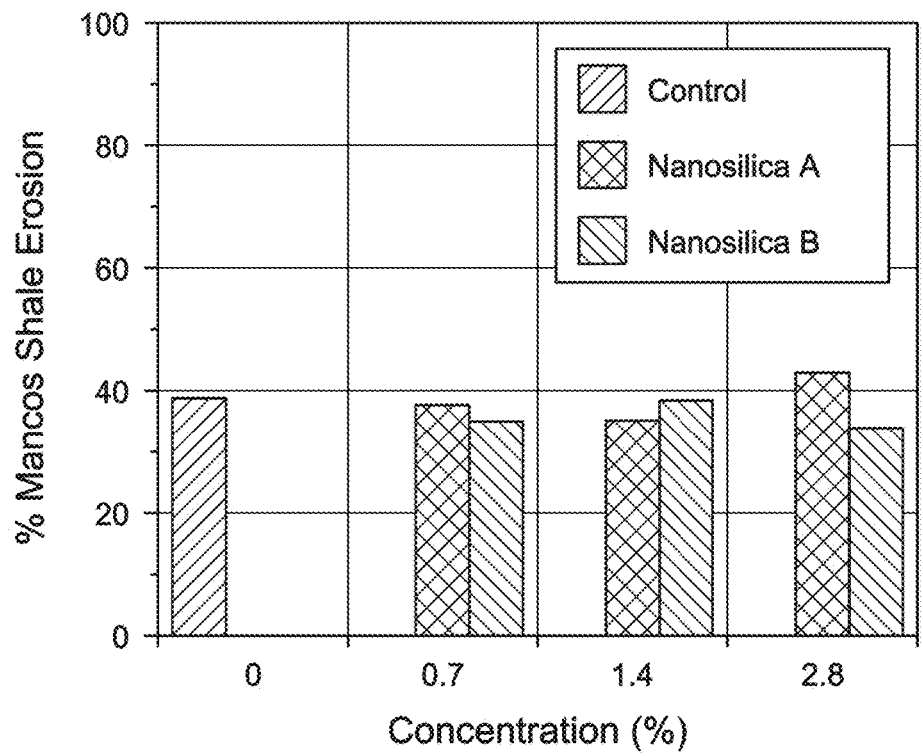
FIG. 5a is a graphical representation of the results from Experiment B with Mancos shale in synthetic sea water.
Figure 5B:
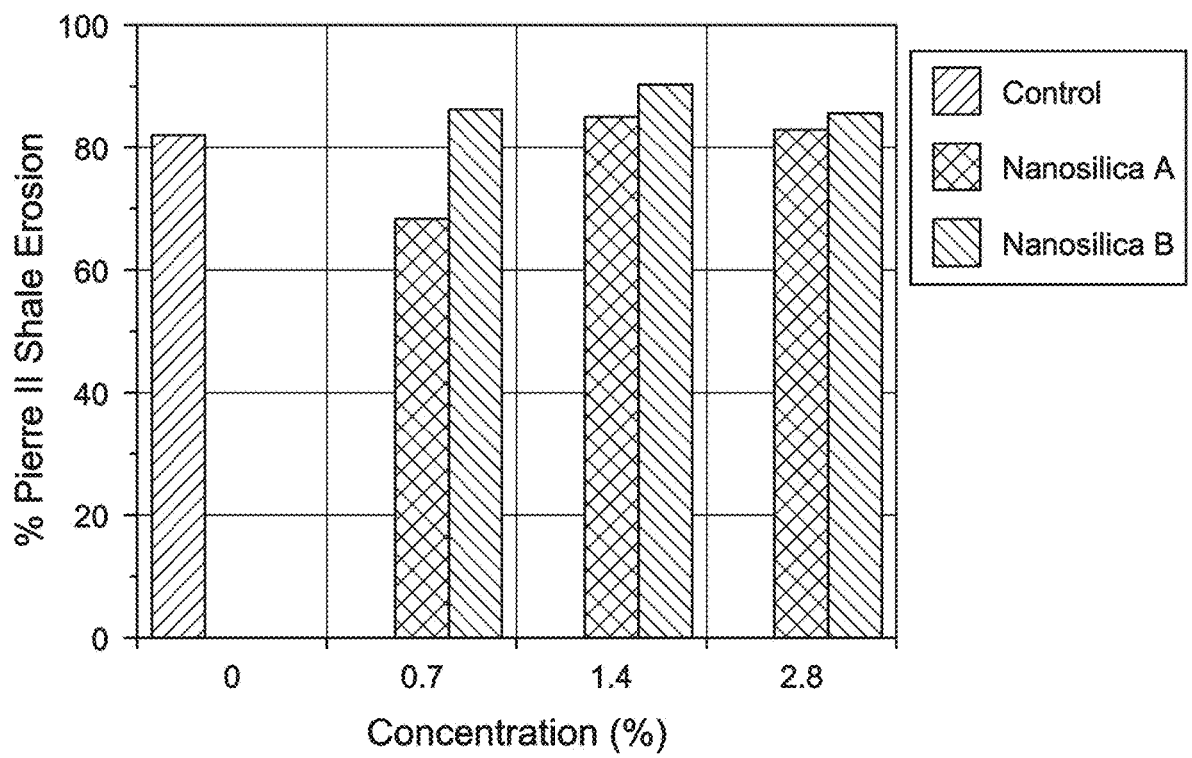
FIG. 5b is a graphical representation of the results from Experiment B with Pierre II shale in synthetic sea water.

Experiment B tested the efficacy of shale erosion inhibition of functionalized nanosilica compositions in the presence of synthetic sea water. The synthetic sea water was measured by inductively coupled plasma mass spectrometry (ICP-MS) and was found to be composed of 30.24 milligram per liter (mg/L) calcium, 1000 mg/L sodium, 42.13 mg/L potassium, and 11.1 mg/L magnesium. The shale inhibitor additives were added to the synthetic sea water according to Table 3. Then the samples were subjected to the Hot Roll Procedure. The weights of the shales were caught on #8, #35, #100, #200, and #300 mesh screens in order to establish a particle size distribution of the shales after the hot rolling process. FIGS. 5a and 5b show the differences in the different particle sizes of shale after the Hot Roll Procedure for each sample. Following the Hot Roll Procedure for the samples with Mancos shale, a #8 mesh screen caught most of the Mancos shale. For the Pierre II shale, most of the shale fell through the #8 mesh screen and the #35 mesh screen, but was held up by the #100 mesh screen.

TABLE 3

The sample formulations for Experiment B in synthetic sea water.

| Sample | Water (ml) | Additive (g) | pH |
|---|---|---|---|
| 1. Control | 350 | 0 | 10 |
| 2. 0.7% Nanosilica A | 350 | 2.5 | 9.65 |
| 3. 1.4% Nanosilica A | 350 | 5.0 | 9.65 |
| 4. 2.8% Nanosilica A | 350 | 10.0 | 9.65 |
| 5. 0.7% Nanosilica B | 350 | 2.5 | 9.65 |
| 6. 1.4% Nanosilica B | 350 | 5.0 | 9.65 |
| 7. 2.8% Nanosilica B | 350 | 10.0 | 9.65 |

Results

Figure 6:
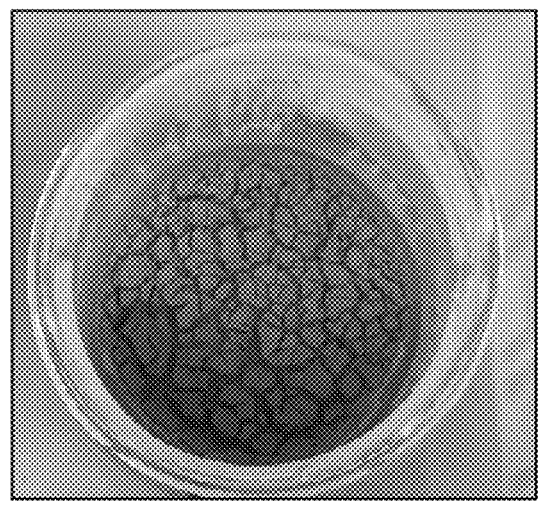
FIG. 6 is a pictorial representation of a shale sample after drying, where the shale sample appeared as a dehydrated solid paste.

The mud produced in Experiment B, like the sample shown in FIG. 6, when dried, produced conglomerates that when sieved had a particle size distribution which may not be directly representative of the actual shale erosion. FIG. 5a is a graph of the results from Experiment B with Mancos shale in synthetic sea water. FIG. 5b is a graph of the results from Experiment B with Pierre II shale in synthetic sea water. The shale erosion shown in FIG. 5b indicates high erosion (>80%) for the Pierre II shale in this medium. Comparing across the shale inhibiting additives it is apparent that, as was the case with fresh water, synthetic sea water is not the appropriate fluid for the comparison of shale erosion prevention efficiency for different shale inhibiting additives with Pierre II shale.

There is little variability in the Mancos shale data for the shale inhibiting additives in synthetic sea water when in the absence of other additives as shown in FIG. 5a. The shale appears to have roughly the same erosion across the different samples tested.

In experiments C and D, fluid compositions based on field muds with synergistic polymer additives are used to test the additives.

Experiment C

Experiment C investigated the efficacy of the functionalized nanosilica compositions, where the synergistic polymer additive is a polyanionic cellulose polymer, in an aqueous-based fluid on Mancos and Pierre II shale erosion rates in both sea water and fresh water.

Fresh Water.

A water-based fluid comprised of xanthan and polyanionic cellulose polymer was used as the aqueous-based fluid for the series of shale inhibiting additive studies in Experiment C. The basic formulation of the aqueous-based fluid (as shown in Table 4) follows a conventional water-based polyanionic cellulose mud. To the aqueous-based fluid of Table 4, different samples were created by adding the shale inhibiting additives according to Table 5. After the fluid was blended for 40 minutes in a Fann Multimixer® Model 9B at 11,500 rpm, 30 grams of #8 mesh shale was added to the fluid. The fluid was subjected to the Hot Roll Procedure.

TABLE 4

Basic fluid for shale erosion studies - a basic polyanionic cellulose (PAC) polymer mud

| Compound | Concentration | Mass (g) |
|---|---|---|
| Fresh Water | 0.91 bbl | 320 |
| Xanthan | 0.5 ppbw[1] | 0.1 |
| KOH[2] | N/A | N/A |
| Sodium Carbonate | 1 ppbw | 0.2 |
| Polyanionic cellulose polymer | 2 ppbw | 0.4 |

[1]ppbw is parts-per-billion by weight.
[2]KOH was added until the pH reached between 8.5 and 10.

TABLE 5

Formulations of shale inhibiting additives for Experiment C.

| Shale Inhibiting Additive | 0.35% | 0.70% | 1.4% | 1.46% | 2.8% |
|---|---|---|---|---|---|
| Nanosilica A | | X | X | | |
| Nanosilica B | | | X | | X |
| Nanosilica C | | X | X | X | |
| Nanosilica D | X | X | X | X | |

After the Hot Roll Procedure the fluid samples were removed from the roller oven and the liquids were decanted and allowed to cool to room temperature. After the liquids reached room temperature, rheologies were taken of the fluids to monitor if any changes in rheology were apparent before and after hot rolling. The shale pieces from each fluid sample were dried in an oven at 220° F. After the materials were dried, they were weighed. They were then passed over a #8 mesh screen. The shale material caught by the mesh was reweighed.

Synthetic Sea Water. The same basic fluid formulation as that depicted in Table 4 was used for experiments of the shale inhibiting additives in a synthetic sea water containing xanthan and polyanionic cellulose, the only difference being the use of sea water. The sea water was made from Instant Ocean® (Blacksburg, Va.) sea salt at a concentration of 42 grams per liter of distilled water.

The shales in the synthetic sea water were tested in the same way as the shales in the fresh water.

Results

Figure 7A:
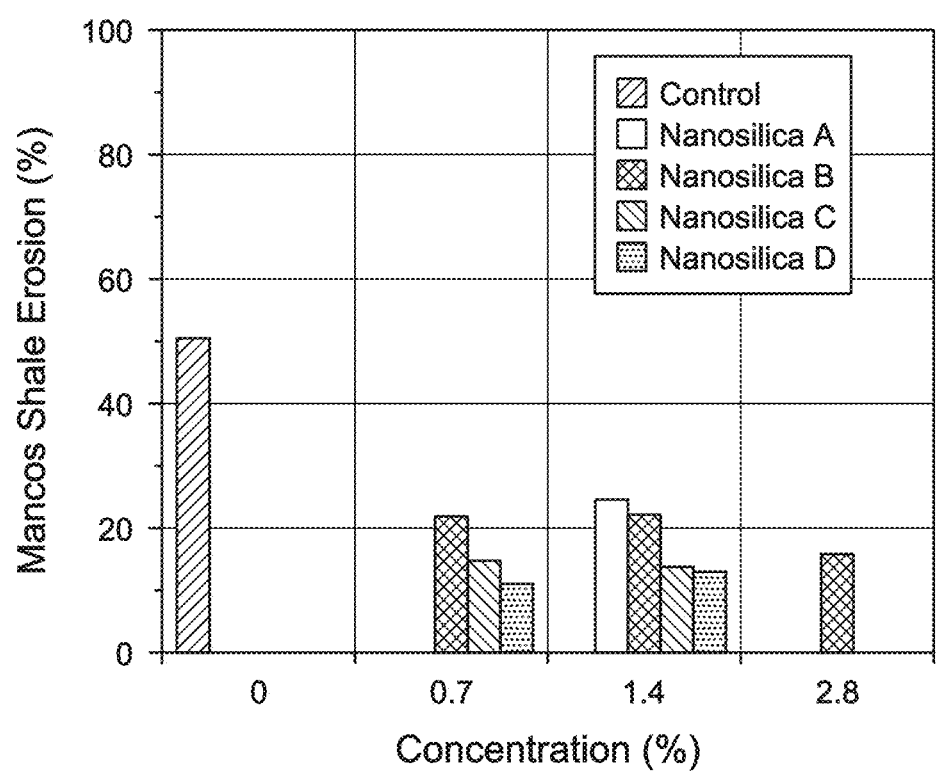
FIG. 7a is a graphical representation of the results from Experiment C showing the Mancos shale erosion in fresh water fluids containing Nanosilica A, Nanosilica B, Nanosilica C, and Nanosilica D.
Figure 7B:
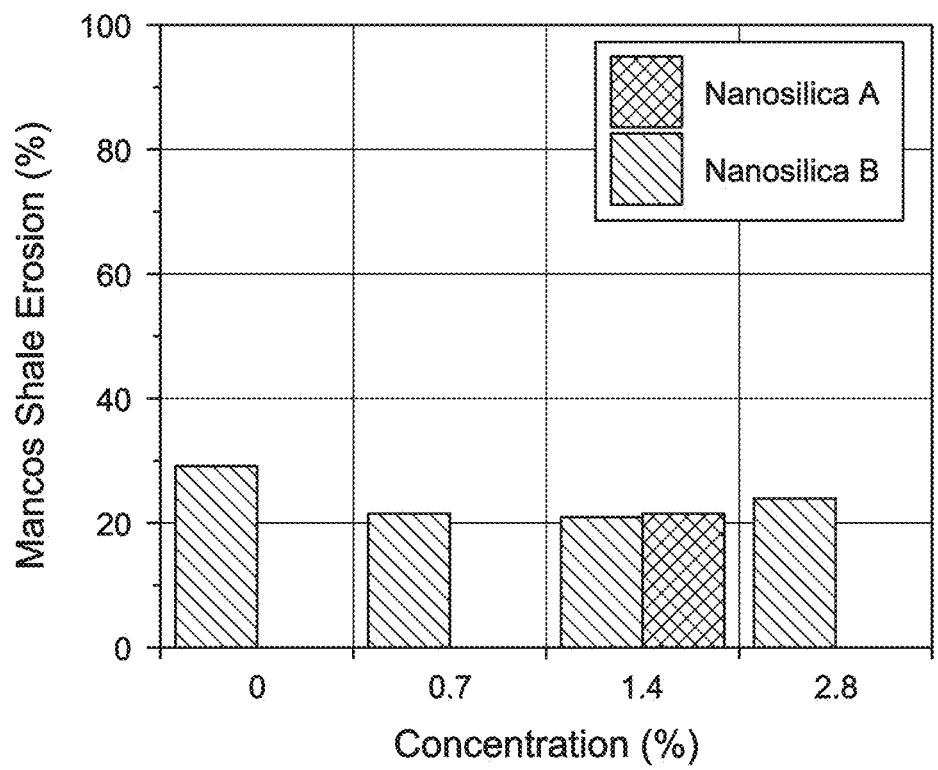
FIG. 7b is a graphical representation of the results from Experiment C showing the Mancos shale erosion in sea water fluids containing Nanosilica A and Nanosilica B.
Figure 7C:
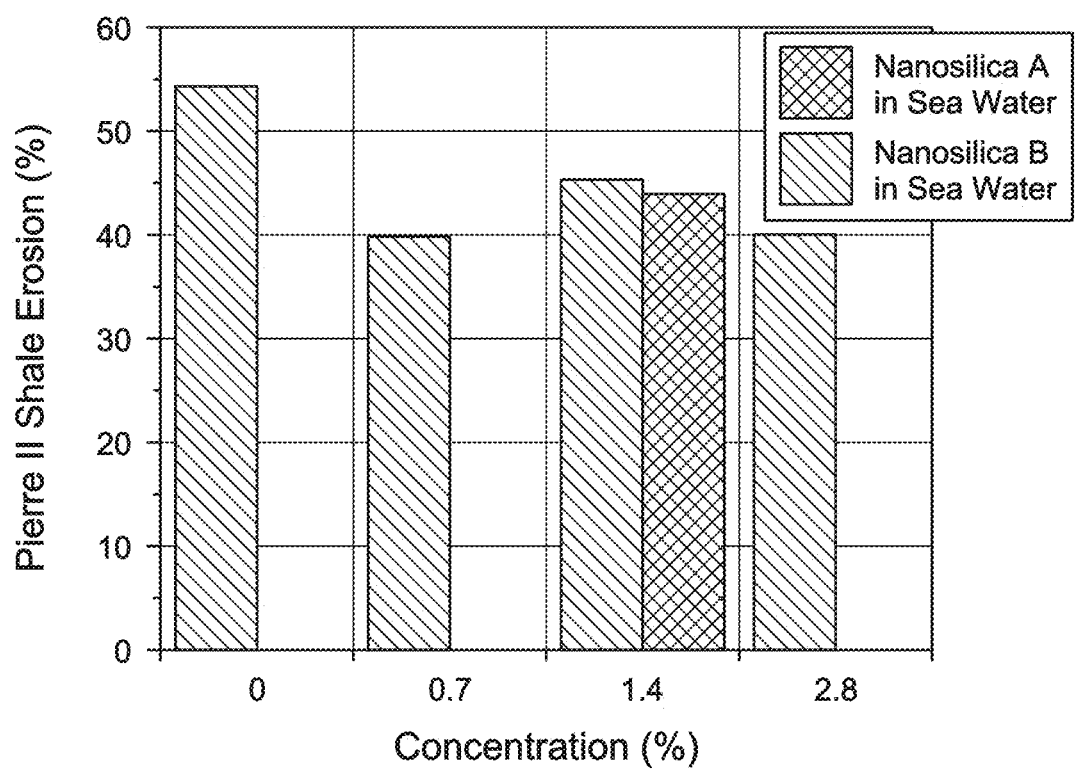
FIG. 7c is a graphical representation of the results from Experiment C showing the Pierre II shale erosion in sea water fluids containing Nanosilica A and Nanosilica B.

The shale inhibiting additives added into the aqueous-based fluids of Table 4 according to Table 5 in Experiment C show some ability to inhibit the erosion of shales. The erosion for a sample of Mancos shale hot rolled with the nanosilica containing fluids of Experiment C reaches 50%. FIG. 7a is a graph of the results showing the Mancos shale erosion in fresh water fluids containing Nanosilica A, Nanosilica B, Nanosilica C, Nanosilica D. FIG. 7b is a graph of the results showing the Mancos shale erosion in sea water fluids containing Nanosilica A and Nanosilica B. FIG. 7c is a graph of the results showing the Pierre II shale erosion in sea water fluids containing Nanosilica A and Nanosilica B. From this data it can be seen that Nanosilica C and Nanosilica D have the greatest effect on the inhibition of Mancos shale in freshwater, with the Nanosilica D exhibiting the highest degree of inhibition. The reactivity of Nanosilica C to shale could be due to the formation of nanosized aggregates of the functionalized nanosilica compositions from the reagent under these conditions. The shale erosion rates described in FIGS. 7a, 7b, and 7c correspond to shales recovered which are sized larger than the #8 mesh screen.

Figure 8A:
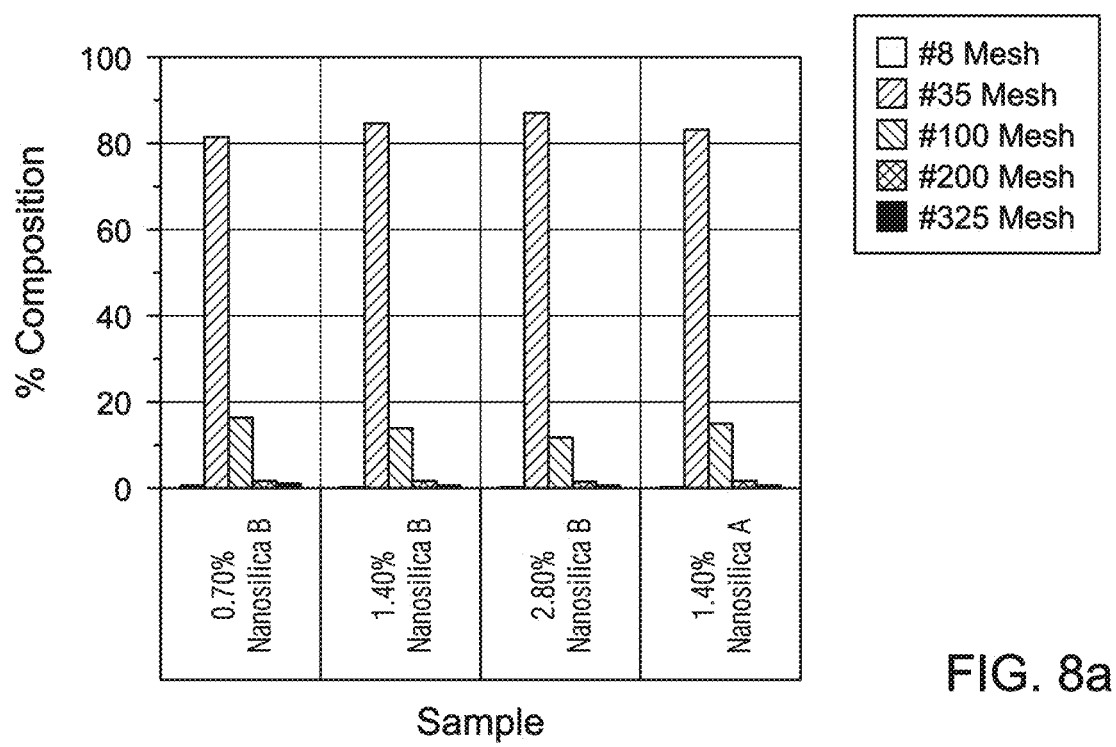
FIG. 8a is a graphical representation of the results from Experiment C showing the distribution of shale particle sizes after hot rolling at 150 degrees Fahrenheit (° F.) for 16 hours.

FIG. 8a is a graph of the results from Experiment C showing the distribution of shale particle sizes after hot rolling at 150° F. for 16 hours. From FIG. 8a, it can be seen that Pierre II shale pieces are made smaller through erosion in this Experiment C than the test in experiment B. There was no shale piece in any of the tests that would be held up by a #8 mesh screen.

Figure 8B:
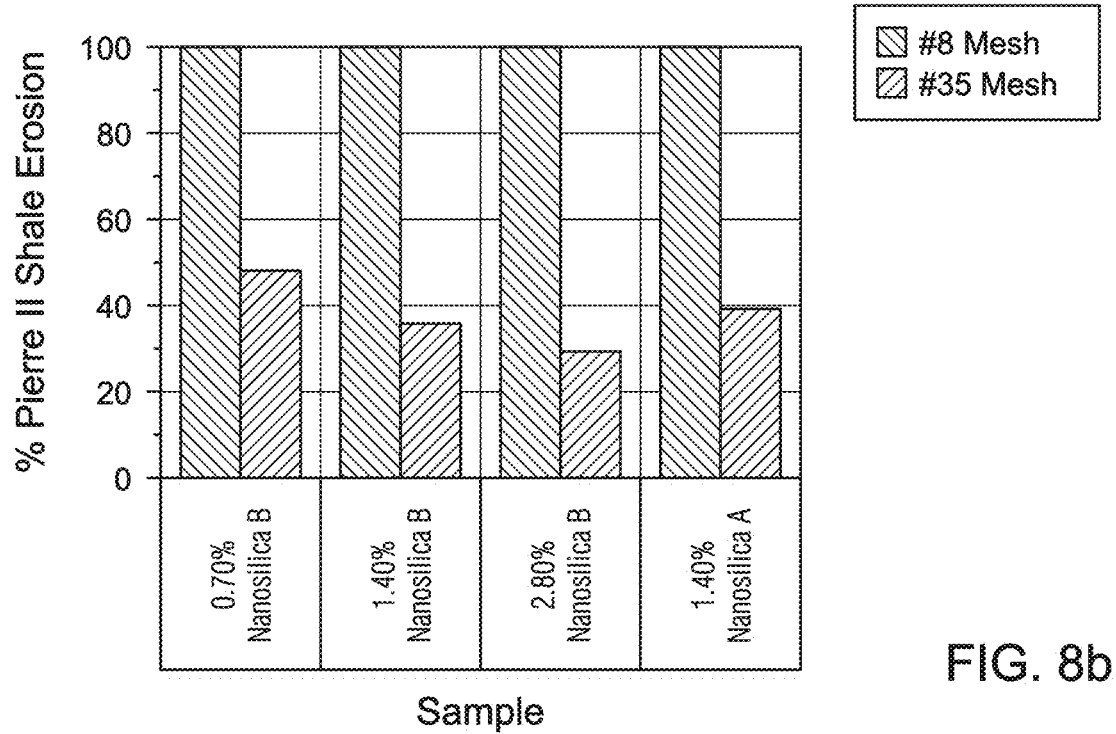
FIG. 8b is a graphical representation of the results from Experiment C showing the percent shale erosion for Pierre II shale after the hot roll procedure.

FIG. 8b is a graph of the results from Experiment C showing the percent shale erosion for Pierre II shale after the hot roll procedure. In FIG. 8b, 100% erosion is indicated for #8 mesh screen for the Pierre II shale. The vast majority of shale pieces were held up by the #35 mesh screen. Nanosilica B renders shale with the highest resistance to erosion during the hot roll test of Pierre II shale in sea water.

The erosion seen for Pierre II shale is greater, across Experiments A-C than that observed in the same fluid systems in the case of Mancos shale. The trends in results, however, are consistent with Mancos shale as with Pierre II shale. The Nanosilica B is consistently more inhibitive than Nanosilica A.

Experiment D. Silicate Mud Comparisons

Experiment D was a comparison of the rate of shale erosion of the functionalized nanosilica compositions for five different muds: a typical silicate mud, a KCl mud, a KCl/silicate mud, a functionalized nanosilica composition/KCl mud, and a nanosilica containing fluid mud. The formulations in Table 6 are from a field mud design for silicate tested for inhibition of Pierre II shale erosion. Experiment D was developed as a point of reference comparing the inhibiting effect of muds formulated with sodium silicate/KCl, with sodium silicate and with the functionalized nanosilica compositions. Five formulations were developed which follow from the design tabulated in Table 6. Table 7 shows the variables across the different fluid designs in this experiment.

TABLE 6

The aqueous-based fluid formulations for the samples in fresh water and in synthetic sea water.

| Component | Concentration |
|---|---|
| Water (Fresh or Synethic Sea Water) | 0.91 bbl |
| Xanthan | 1.0 ppbw |
| Polyanionic Cellulose Polymer | 1.5 ppbw |
| Low Viscosity Polyanionic Cellulose | 1.0 ppbw |
| Starch | 4.0 ppbw |
| Sodium Hydroxide | 0.5 ppbw |
| Sodium Carbonate | 1.0 ppbw |
| Potassium Chloride | [See Table 7] |
| Sodium Silicate | [See Table 7] |
| Nanosilica B | [See Table 7] |

TABLE 7

Shale inhibiting additives for the aqueous-based fluids of Table 6.

|  | KCl/silicate mud | KCl mud | Silicate mud | Nanosilica B/ KCl mud | Nanosilica B mud |
|---|---|---|---|---|---|
| Potassium Chloride | 10.0 ppbw | 10.0 ppbw | — | 10.0 ppbw | — |
| Sodium Silicate | 5.0% v/v | — | 5.0% v/v | — | — |
| Nanosilica B | — | — | — | 2.86% v/v | 2.86% v/v |
| pH | 12.05 | 12.26 | 12.04 | 8.93 | 9.75 |

Figure 9A:
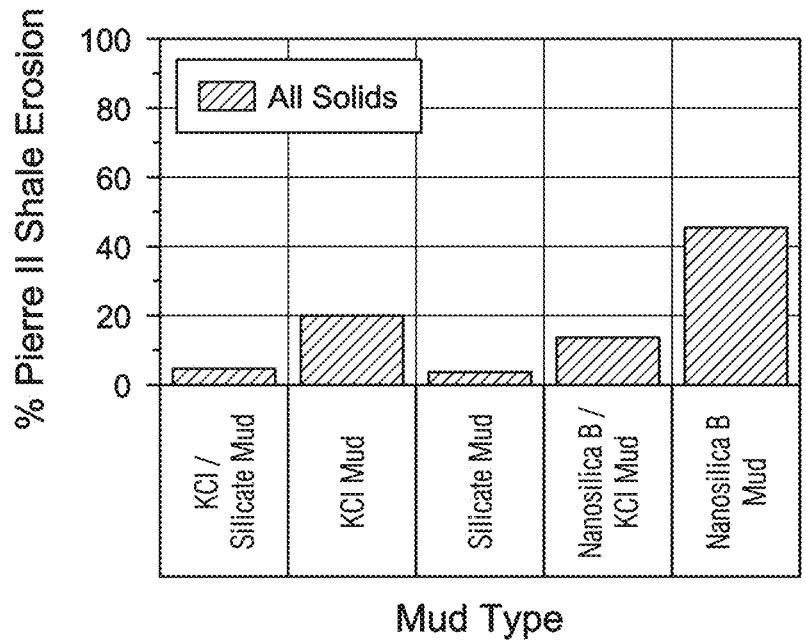
FIG. 9a is a graphical representation of the results from Experiment D showing the percent shale erosion for all solids of the Pierre II shale after the hot roll procedure.
Figure 9B:
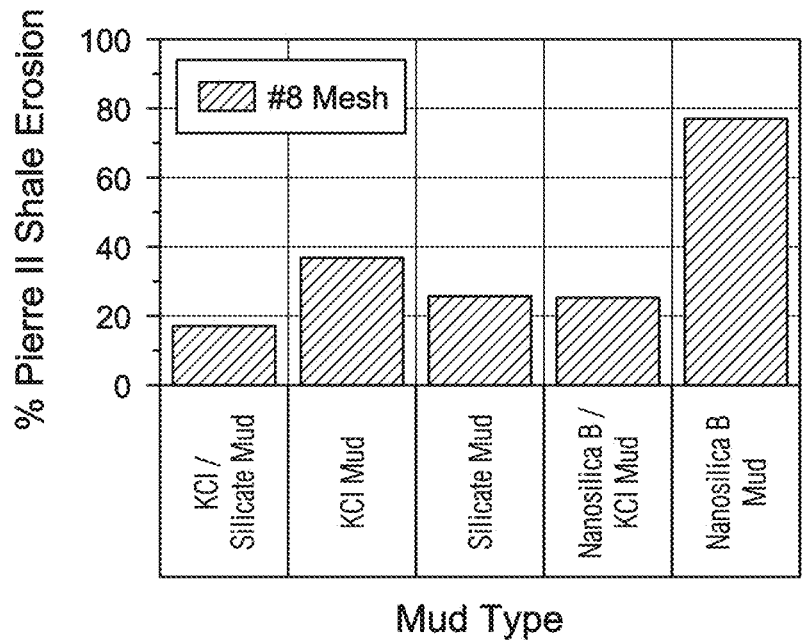
FIG. 9b is a graphical representation of the results from Experiment D showing the percent shale erosion that passed through a number (#) 4 mesh screen, but not a #8 mesh screen for Pierre II shale.

As in Experiments A-C, the five mud types formulated as in Tables 6 and 7 were subjected to the Hot Roll Procedure with 30 grams of Pierre II shale (between #4 and #8 mesh) and the amount of Pierre II shale (between #4 and #8 mesh) that were recovered are charted in FIG. 9b. FIG. 9b is a graph of the results showing the percent shale erosion that passed through a #4 mesh screen, but not a #8 mesh screen for Pierre II shale. The total shale recovered, irrespective of particle size, is shown in FIG. 9a. FIG. 9a is a graph of the results showing the percent shale erosion for all solids of the Pierre II shale after the hot roll procedure. The comparison of FIGS. 9a and 9b indicate that some of the shale eroded to smaller particle sizes while typically the total mass loss in two of the samples (silica mud and silicate/KCl mud) remained below 5%.

Results

The results using synthetic sea water as the aqueous-based fluid, show that the KCl/silicate mud gives the lowest value for Pierre II shale erosion with 17.1% shale erosion of shale that passed through a #4 mesh screen, but not a #8 mesh screen. The next best is the Nanosilica B/KCl mud. This gives 24.5% shale erosion of shale pieces based on what passed through a #4 mesh screen, but not a #8 mesh screen. Then the remaining muds, ranked 3 through 5 are silicate mud with 25.9% shale erosion, KCl mud with 37.3% shale erosion, and Nanosilica B mud with 77.4% shale erosion.

Figure 10A:
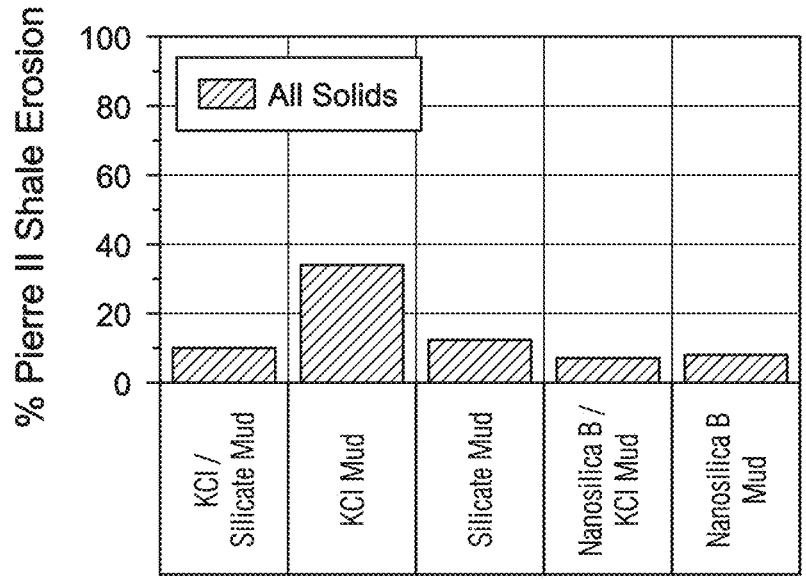
FIG. 10a is a graphical representation of the results from Experiment D using salt water showing the percent shale erosion for all solids of the Pierre II shale after the hot roll procedure.
Figure 10B:
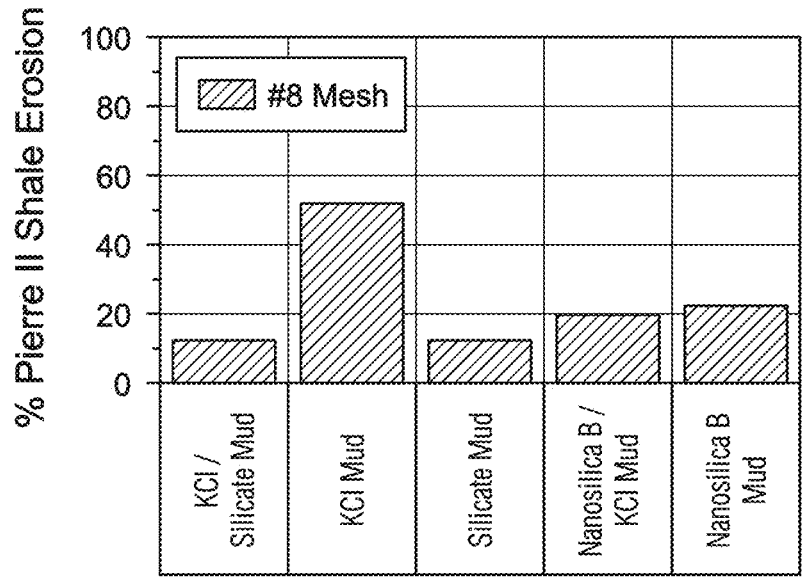
FIG. 10b is a graphical representation of the results from Experiment D using salt water showing the percent shale erosion that passed through a number (#) 4 mesh screen, but not a #8 mesh screen for Pierre II shale.

FIG. 10a is a graph of the results from Experiment D using synethic sea water showing the percent shale erosion for all solids of the Pierre II shale after the hot roll procedure. FIG. 10b is a graph of the results from Experiment D using synthetic sea water showing the percent shale erosion that passed through a number (#) 4 mesh screen, but not a #8 mesh screen for Pierre II shale. As illustrated in FIGS. 10a and 10b, Nanosilica B, was the most effective shale inhibiting additive of the Table 6 formulation with synthetic sea water. In terms of the amount of shale that remains larger than the #8 mesh screen size, KCl/silicate mud and silicate mud show less erosion than the nanosilica muds tested (FIG. 11b). KCl/silicate mud and silicate mud displays 12.5% and 12.6% erosion, respectively, while Nanosilica B/KCl Mud and Nanosilica B Mud showed 19.5% and 22.4% erosion. The KCl mud had the worst performance in this regard at 51.7% erosion. These are the erosion rates for particles greater that #8 mesh size.

On the other hand, the total Pierre II shale erosion with Nanosilica B in this mud formulation is 5.3%. When KCl is also present, the formulation gives just 4.2% shale erosion. In contrast, the silicate mud formulation yields 9.5% shale erosion, the KCl mud formulation gives a 31.7% shale erosion, and the KCl/silicate mud formulation gives a 7.5% shale erosion. The data graphed in FIGS. 10a and 10b indicate that while more particles are of the same particle size (before and after hot rolling) in the case of KCl/silicate muds than any other muds sampled, KCl/nanosilica muds have the least overall complete disintegration shale. Without being limited to a particular theory, the shale erosion of the KCl/silicate could indicate that once a shale particle in the silicate mud begins eroding, it disintegrates more completely and more quickly than a shale in a nanosilica mud.

In addition to the higher performance of nanosilica muds, the pH of the nanosilica muds are much lower at about pH 9 to 10 as compared with the silicate mud formulations which are typically about pH 12. Nanosilica is an environmentally innocuous material which is less caustic and may be a safer product to handle than silicate muds. It also can be more effective than silicate in shale inhibition in sea water with the formulations tested.

The data indicate that a nanosilica containing fluid achieves 5.3% total shale erosion after the hot roll test in sea water while silicate/KCl muds show 7.5%. This increased performance of nanosilica is accompanied by greater ease in handling the lower pH fluid (which can range from pH 8.5 to 10.0) compared to silicate muds which often exceed pH 12. In addition to being more potent inhibitors and more safe to handle, nanosilicas offer the possibility of lower minimized environmental damage.

The Experiments A through D show the testing of different nanosilicas as shale inhibitors in the presence of two different types of shale, Mancos shale and Pierre II shale. In the results, the Pierre II shale contained more smectite than the Mancos shale and was, therefore, more water-reactive than the less smectite-rich, Mancos shale. The fluid systems formulated in Experiments C and D are significantly more inhibitive to shales than the fluid systems of Experiments A and B. This indicates a synergy between the synergistic additive polymer and the functionalized nanosilica composition leading to enhanced effectiveness of shale inhibition.

Comparing the inhibiting effect of different functionalized nanosilica compositions with KCl muds, silicate muds, and silicate/KCl muds showed that Nanosilica B appeared to have a strong inhibiting effect, especially in simulated sea water. Without being bound to a particular theory, these results suggest that there is an ion effect which strengthens the inhibitive effect of nanosilica. In the presence of magnesium and calcium ions, nanosilica containing fluid systems are comparable and possibly more powerful inhibitors than silicate/KCl muds.

Experiment E. Nanosilica C Comparison with Nanosilica B

Experiment E investigated the efficacy of Nanosilica B and Nanosilica C on Pierre II shale erosion rates in both fresh water and synthetic sea water.

TABLE 8

The aqueous-based fluid formulations for the samples in fresh water and in synthetic sea water.

| Component | Concentration |
|---|---|
| Water (Fresh or Synethic Sea Water) | 0.91 bbl |
| Xanthan | 1.0 ppbw |
| Polyanionic Cellulose | 1.5 ppbw |
| Low Viscosity Polyanionic Cellulose | 1.0 ppbw |
| Starch | 4.0 ppbw |
| Sodium Hydroxide | 0.5 ppbw |
| Sodium Carbonate | 1.0 ppbw |
| Nanosilica C | [See Table 9] |
| Nanosilica D | [See Table 9] |
| Nanosilica B | [See Table 9] |

TABLE 9

Shale inhibiting additives for the aqueous-based fluids of Table 8.

| | Nanosilica C | Nanosilica C/KCl | Nanosilica D | Nanosilica D/KCl | Nanosilica B | Nanosilica B/KCl |
|---|---|---|---|---|---|---|
| Nanosilica C | 2.86% v/v | 2.86% v/v | — | — | — | — |
| Nanosilica D | — | — | 2.86% v/v | 2.86% v/v | — | — |
| Nanosilica B | — | — | — | — | 2.86% v/v | 2.86% v/v |
| KCl | — | 10 ppbw | — | 10 ppbw | — | 10 ppbw |
| pH in fresh water | 11.2 | 10.71 | 10.97 | 10.55 | 10.47 | 9.8 |
| pH in synthetic sea water | 9.58 | 9.68 | 9.4 | 9.55 | .56 | 9.62 |

The five mud types formulated as in Tables 8 and 9 were subjected to the Hot Roll Procedure with 30 grams of Pierre II shale (between #4 and #8 mesh)

Results

Figure 11A:
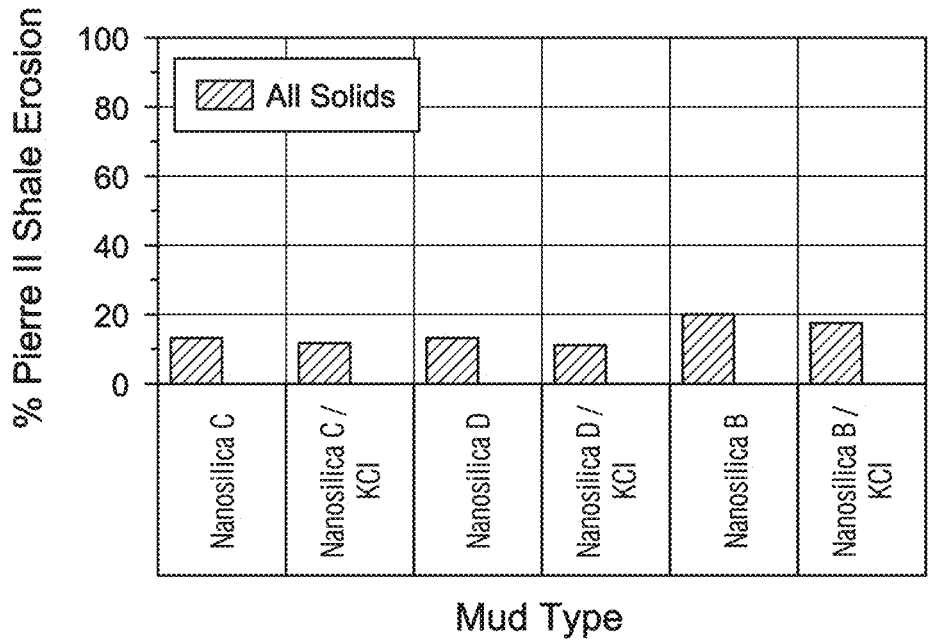
FIG. 11a is a graphical representation of the results from Experiment E using fresh water showing the percent shale erosion for all solids of the Pierre II shale after the hot roll procedure.
Figure 11B:
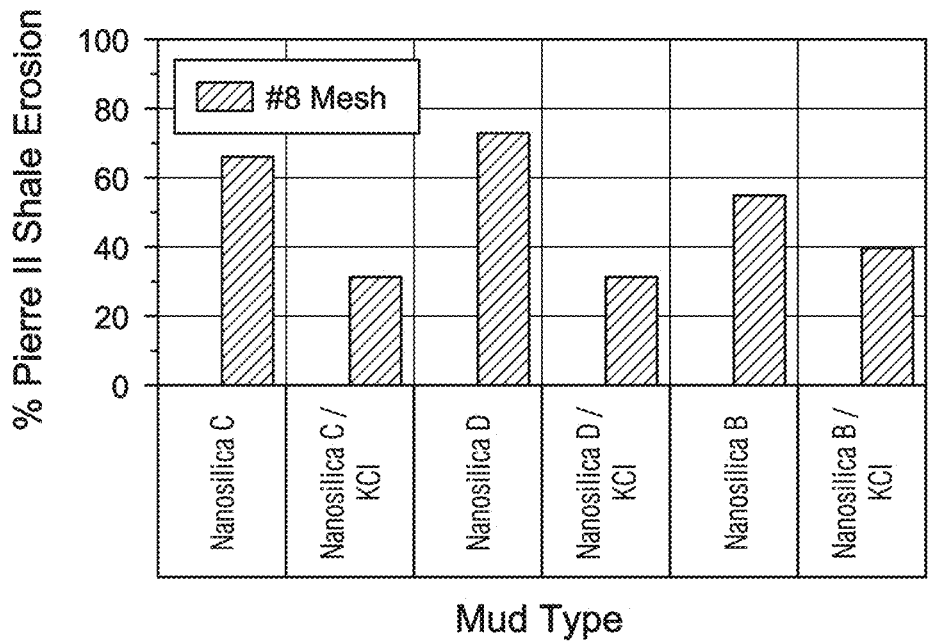
FIG. 11b is a graphical representation of the results from Experiment E using fresh water showing the percent shale erosion that passed through a number (#) 4 mesh screen, but not a #8 mesh screen for Pierre II shale.

FIG. 11a is a graph of the results from Experiment E using fresh water showing the percent shale erosion for all solids of the Pierre II shale after the hot roll procedure. FIG. 11b is a graph of the results from Experiment E using fresh water showing the percent shale erosion for #4 mesh screen and #8 mesh screen for Pierre II shale. As shown in FIGS. 11a and 11b, the case of the fresh water mud, the least amount of total solids lost after the 16 hour hot roll was seen in the case of the Nanosilica C/KCl mud with 11.9%. The Nanosilica C mud in the absence of KCl displayed 13.2% erosion. Taking into account the shale erosion of greater than #8 sieve size, the Nanosilica C/KCl mud also did the best with 31.4% erosion. The Nanosilica D/KCl mud was close behind with 31.7% shale erosion. In the absence of KCl, the Nanosilica B mud had the best erosion rate at 54.9%.

Figure 13A:
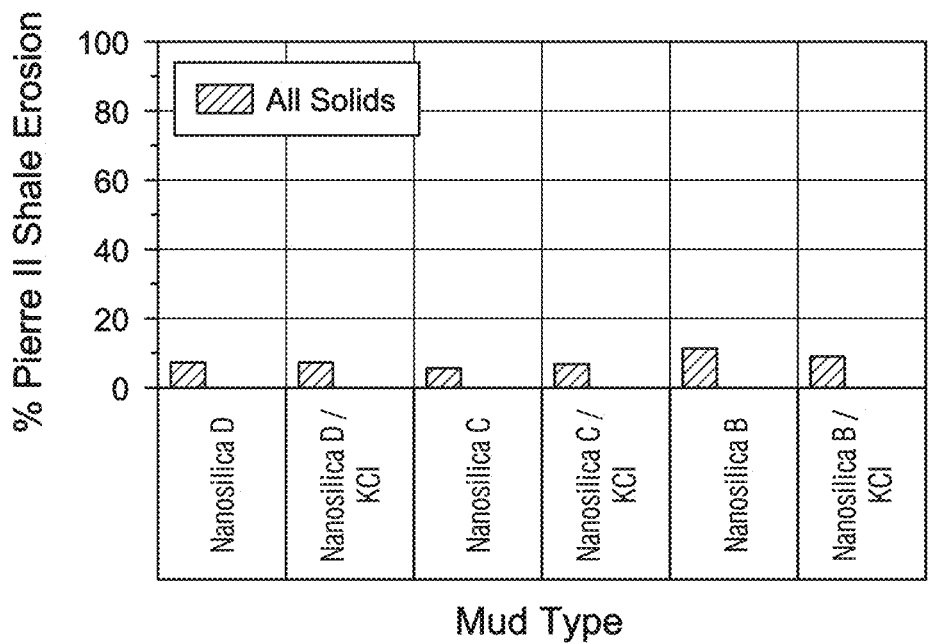
FIG. 13a is a graphical representation of the results from Experiment E using sea water showing the percent shale erosion for all solids of the Pierre II shale after the hot roll procedure.
Figure 13B:
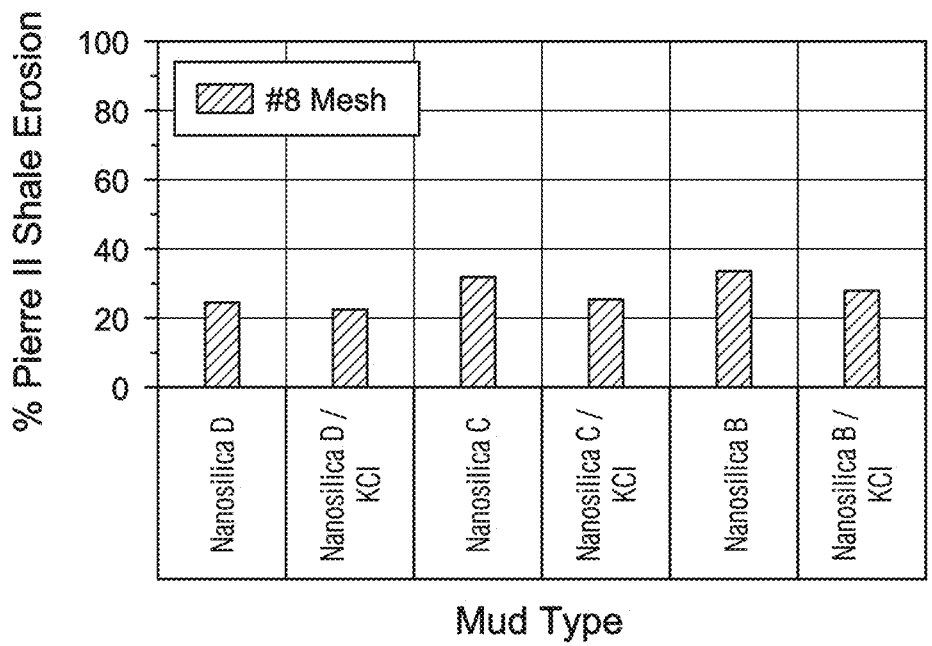
FIG. 13b is a graphical representation of the results from Experiment E using sea water showing the percent shale erosion that passed through a number (#) 4 mesh screen, but not a #8 mesh screen for Pierre II shale.

FIG. 13a is a graph of the results from Experiment E using sea water showing the percent shale erosion for all solids of the Pierre II shale after the hot roll procedure. FIG. 13b is a graph of the results from Experiment E using sea water showing the percent shale erosion for #4 mesh screen and #8 mesh screen for Pierre II shale. As shown in FIGS. 13a and 13b, the case of synthetic sea water mud, in sea water, while Nanosilica D had the lowest erosion for shale in the particle size for between #4 and #8 mesh (with 22.8% erosion), Nanosilica C had the highest total solids retention (with 5.9% erosion).

Figure 12:
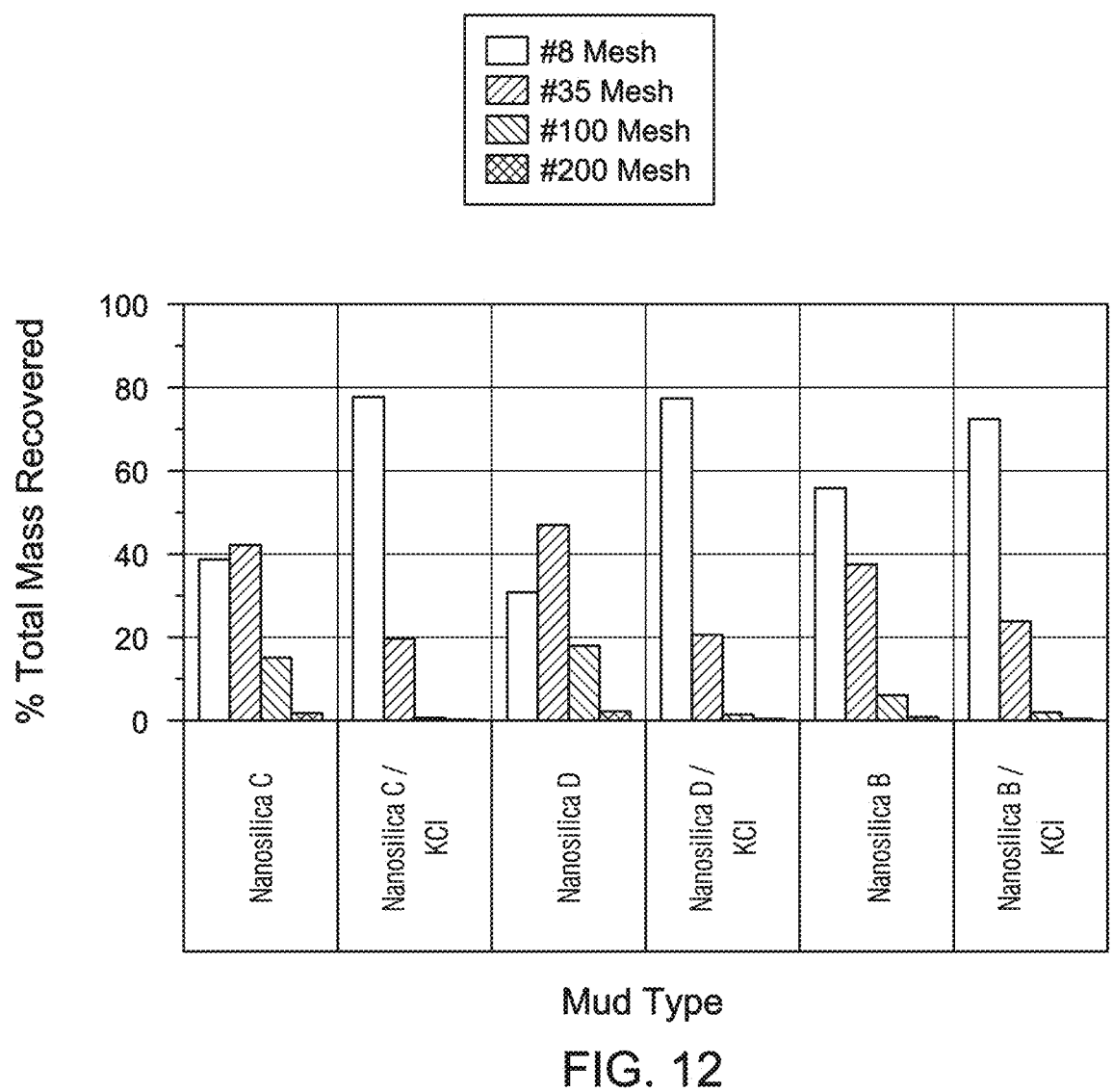
FIG. 12 is a graphical representation of the results from Experiment E showing the distribution of shale particles sizes after hot rolling various muds in fresh water.

FIG. 12 is a graph of the results from Experiment E showing the distribution of shale particles sizes after hot rolling various muds in fresh water. As shown in FIG. 12, Nanosilica B in the absence of KCl, had the highest % of mass concentrated above #8 mesh screen. In the presence of KCl, Nanosilica C and Nanosilica D muds had the highest concentration of larger solids (#8 mesh screen).

Although the technology has been described in detail, it should be understood that various changes, substitutions, and alterations can be made hereupon without departing from the inventive principle and scope. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed as from one particular value to another particular value. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art, except when these references contradict the statements made here.

As used here and in the appended claims, the words "comprise," "has," and "include" and all grammatical variations thereof are each intended to have an open, non-limiting meaning that does not exclude additional elements or steps.

What is claimed is:

1. A nanosilica containing fluid system for shale stabilization in a shale formation, the nanosilica containing fluid system comprising:
   a functionalized nanosilica composition operable to inhibit the erosion of shale, the functionalized nanosilica composition comprising:
      a nanosilica particle, the nanosilica particle having a mean diameter, and
      a functionalization compound, the functionalization compound appended to the surface of the nanosilica particle, wherein the functionalization compound comprises an amino(alkyl)$_n$-amino(alkyl)$_m$, silane, wherein the alkyl groups are composed of 1 to 18 carbon atoms per molecule, wherein n is a number between 1 and 18 and m is a number between 1 and 18;

an aqueous-based fluid, the aqueous-based fluid operable to carry the functionalized nanosilica composition into the shale formation;

a synergistic polymer additive, the synergistic polymer additive operable to interact synergistically with the functionalized nanosilica composition; and added salt, wherein the added salt is selected from the group consisting of potassium chloride, sodium chloride, and combinations of the same.

2. The nanosilica containing fluid system of claim 1, wherein the functionalization compound is 2-aminoethyl-3-aminopropyl trimethoxysilane.

3. The nanosilica containing fluid system of claim 1, wherein the mean diameter of the nanosilica particle is between 1 nm and 1000 nm.

4. The nanosilica containing fluid system of claim 1, wherein the mean diameter of the nanosilica particle is less than 20 nm.

5. The nanosilica containing fluid system of claim 1, wherein the aqueous-based fluid is selected from the group consisting of water, deionized water, sea water, brine and combinations thereof.

6. The nanosilica containing fluid system of claim 1, wherein the synergistic polymer additive is polyanionic cellulose.

7. A composition for shale stabilization, the composition comprising:

a functionalized nanosilica composition, the functionalized nanosilica composition comprising:

a nanosilica particle, the nanosilica particle having a mean diameter, and a functionalization compound, the functionalization compound appended to the surface of the nanosilica particle, wherein the functionalization compound comprises an amino(alkyl)$_n$amino(alkyl)$_m$silane, wherein the alkyl group are composed of 1 to 18 carbon atoms per molecule, wherein n is a number between 1 and 18 and m is a number between 1 and 18;

a synergistic polymer additive, wherein the functionalized nanosilica composition and the synergistic polymer additive are operable to interact synergistically such that the synergy between the functionalized nanosilica composition and the synergistic polymer additive is operable to provide shale inhibition; and added salt, wherein the added salt is selected from the group consisting of potassium chloride, sodium chloride, and combinations of the same.

8. The composition of claim 7, wherein the mean diameter of the nanosilica particle is between 1 nm and 1000 nm.

9. The composition of claim 7, wherein the mean diameter of the nanosilica particle is less than 20 nm.

10. The composition of claim 7, wherein the synergistic polymer additive is polyanionic cellulose.

11. The composition of claim 7, wherein the synergistic polymer additive is present in an amount between 0.1 pounds per barrel and 15 pounds per barrel.

* * * * *